Patented Jan. 9, 1934

1,942,530

UNITED STATES PATENT OFFICE 1,942,530

PRODUCTION OF OXYGENATED ORGANIC COMPOUNDS

Walter Bader and Edward Boaden Thomas, Spondon, near Derby, England, assignors to Celanese Corporation of America, a corporation of Delaware No Drawing. Application February 10, 1930, Serial No. 427,417, and in Great Britain April 12, 1929

6 Claims. (Cl. 260—156)

This invention relates to the production of oxygenated organic compounds by the catalytic reduction of oxides of carbon, and is especially applicable to the manufacture of methyl alcohol from gaseous mixtures containing hydrogen and carbon monoxide under high pressure and temperature.

The catalytic bodies hitherto employed in processes of the above character have included metals or metal oxides or metallic compounds which are converted into metals or metal oxides under the conditions of the reaction. In practice, advantage has been found to accrue from the use of mixtures as catalytic masses. Thus, mixtures of metallic oxides with metals, or of basic oxides with acidic oxides, have been recommended; catalytic masses containing an admixture of metal chlorides have also been proposed. The catalytic mass usually employed in the industrial manufacture of methyl alcohol consists substantially of a mixture of zinc oxide with chromium oxide.

In most of the published work on the synthetic production of oxygenated organic compounds, great stress is laid on the condition that the gaseous mixture that is employed should be free from impurities that exert a poisonous action on the catalytic mass. The presence of sulphur compounds in the gaseous mixture is regarded as peculiarly detrimental to the efficiency of the reaction. It is true that it has been claimed for certain catalysts that they are only little influenced by the presence of sulphur in the gaseous mixture, but even when these catalysts are used the sulphur is considered to exert a definitely poisonous effect.

Contrary to the general opinion that sulphur is under all circumstances a catalyst poison, the surprising fact has now been discovered that a very satisfactory catalyst for the synthetic production of methyl alcohol from gaseous mixtures containing hydrogen and carbon monoxide can be obtained by substituting zinc sulphide for the zinc oxide hitherto customarily employed.

According to the present invention, oxygenated organic compounds are synthetically prepared by subjecting gaseous mixtures containing hydrogen and oxides of carbon to the action of heat and pressure in the presence of a catalytic mass comprising the catalytic metal in the form of its sulphide.

As applied to the manufacture of methyl alcohol, this invention contemplates the subjection of the gaseous mixture containing hydrogen and carbon monoxide to the action of heat and pressure in the presence of a catalytic mass comprising zinc sulphide. The zinc sulphide may be used alone or in admixture, and especially in conjunction with any of the usual additions made in the preparation of catalytic mixtures having a basis of zinc oxide. Advantage has been found in the use of zinc sulphide mixed with chromium oxide as a promoter.

The catalyst employed in accordance with this invention does not appear to be detrimentally affected or poisoned by the presence of sulphur in the gaseous mixtures employed. During the course of the reaction, the zinc sulphide catalyst appears to undergo a slight reduction in its content of sulphur, but not to such an extent as materially to alter its character as a sulphide.

The following example is intended to illustrate the invention, but is not to be regarded as limiting it in any way.

Example

An aqueous solution containing zinc nitrate and chromium nitrate in the proportion of about 4 atoms of zinc to 1 atom of chromium is precipitated by the addition of an excess of sodium sulphide in aqueous solution. The precipitate is washed, filtered, pressed and dried, the drying being completed with the aid of heat. The product obtained is employed as a catalyst for the production of methanol under the conditions normally employed in the synthetic production of methanol from gaseous mixtures containing hydrogen and carbon monoxide. The activity of the catalyst increases considerably during the earlier stages of its use. Good results are obtained by conducting the reaction under pressure in the neighbourhood of 100 atmospheres and temperatures of 360-400° C. The product may be purified or deodorized by known processes if a product of a high grade of purity is desired.

While the invention has been described with particular reference to the synthetic production of methyl alcohol from gaseous mixtures containing hydrogen and carbon monoxide with the aid of zinc sulphide or of mixtures containing zinc sulphide as the predominant constituent, it is also applicable to the production of other oxygenated organic compounds from mixtures containing hydrogen and oxides of carbon broadly. The sulphide of zinc can be employed as catalyst either alone or in admixture with such other catalytic agents, or promoters, or carriers, as are applicable to the production of catalytic masses for use in the synthetic manufacture of oxygenated organic compounds, and can be replaced as sole catalyst or in the novel catalytic masses by the sulphides of other metals applicable as catalytic metals in the synthesis of oxygenated organic compounds, such for example as copper, lead, cadmium or the like.

What we claim and desire to secure by Letters Patent is:—

1. Process for the manufacture of oxygenated organic compounds which comprises subjecting gaseous mixtures containing hydrogen and oxides of carbon to the action of heat and pressure in the presence of a catalyst mass containing a catalytic metal selected from the group consisting of zinc, copper, lead and cadmium solely in the form of its sulphide.

2. Process for the manufacture of oxygenated organic compounds which comprises subjecting gaseous mixtures containing hydrogen and oxides of carbon to the action of heat and pressure in the presence of a catalyst mass containing zinc solely in the form of its sulphide.

3. Process for the manufacture of oxygenated organic compounds which comprises subjecting gaseous mixtures containing hydrogen and oxides of carbon to the action of heat and pressure in the presence of a catalyst mass containing zinc solely in the form of its sulphide and chromium oxide.

4. Process for the manufacture of oxygenated organic compounds which comprises subjecting gaseous mixtures containing hydrogen and oxides of carbon to temperatures of between 360 and 400° C., and under pressures of about 100 atmospheres in the presence of the catalyst mass containing a catalytic metal selected from the group consisting of zinc, copper, lead and cadmium solely in the form of its sulphide.

5. Process for the manufacture of methanol which comprises subjecting gaseous mixtures containing hydrogen and oxides of carbon to the action of heat and pressure in the presence of a catalyst mass containing zinc solely in the form of its sulphide.

6. Process for the manufacture of methanol which comprises subjecting gaseous mixtures containing hydrogen and oxides of carbon to the action of temperatures of between 360 and 400° C., under pressures of about 100 atmospheres in the presence of a catalyst mass containing zinc solely in the form of its sulphide and chromium oxide.

WALTER BADER.
EDWARD BOADEN THOMAS.